United States Patent [19]

Ma et al.

[11] Patent Number: 5,459,637
[45] Date of Patent: Oct. 17, 1995

[54] PORTABLE NOTEBOOK COMPUTER EXPANSION ADAPTER

[76] Inventors: Hsi K. Ma; Chan-Ik Chung, both of 4F, No. 48, Sec. 2, Chung Cherng Rd., Taipei, Taiwan

[21] Appl. No.: 162,851

[22] Filed: Dec. 6, 1993

[51] Int. Cl.⁶ .................. G06F 1/16; H05K 7/10
[52] U.S. Cl. ............................. 361/686; 439/638
[58] Field of Search ............. 364/708.1; 439/371, 439/540, 638, 639, 928; 361/683–686; 312/223.2

[56] References Cited

U.S. PATENT DOCUMENTS

| | | | |
|---|---|---|---|
| 4,343,525 | 8/1982 | Knickerbocker | 439/371 |
| 4,546,267 | 10/1985 | Urfirer | 439/638 X |
| 4,702,540 | 10/1987 | Siemon | 439/371 |
| 4,846,596 | 7/1989 | Haranishi | 361/684 X |
| 5,156,556 | 10/1992 | Ma | 439/928 X |
| 5,159,533 | 10/1992 | Kuang | 361/686 X |
| 5,186,646 | 2/1993 | Pederson | 439/540 X |
| 5,299,099 | 3/1994 | Archambault | 439/371 X |

Primary Examiner—Michael W. Phillips
Attorney, Agent, or Firm—Bucknam and Archer

[57] ABSTRACT

A portable notebook computer expansion adapter includes a flat base plate fitting over the notebook computer to be connected and having a plurality of expansion connectors on a bottom surface thereof for connecting a computer peripheral equipment to the notebook computer and a handle for carrying by hand; and a stop wall raised from the flat base plate at one side and stopped against said notebook computer in a flush manner, the stop wall having a mainframe connector connected to a respective connector on the notebook computer and an electric circuit connected to the expansion connectors of the flat base plate, and a through hole which receives the I/O connector of the notebook computer.

2 Claims, 2 Drawing Sheets

PORTABLE NOTEBOOK COMPUTER EXPANSION ADAPTER

BACKGROUND OF THE INVENTION

The present invention relates to a portable adapter for connecting peripheral equipment to a notebook computer which has a handle for carrying.

Various notebook computers are known and widely accepted for the advantage of high mobility. When a notebook computer is used, different peripheral equipment may be added to the notebook to expand its functions. Further, regular notebooks do not have any handle means for carrying by hand. Therefore, a notebook computer must be held in hand or received in a suitcase or the like while carrying.

SUMMARY OF THE INVENTION

The present invention has been accomplished under the aforesaid circumstances. It is therefore an object of the present invention to provide a portable notebook computer expansion adapter which is practical in use to connect peripheral equipment to a notebook computer. It is another object of the present invention to provide a portable notebook computer expansion adapter which has a handle for carrying by hand. It is another object of the present invention to provide a portable notebook computer expansion adapter which allows the notebook computer and the related peripheral equipment being connected thereto to be conveniently carried by hand.

DETAILED DESCRIPTION OF THE PREFERRED EMBODIMENT

Figure 1:
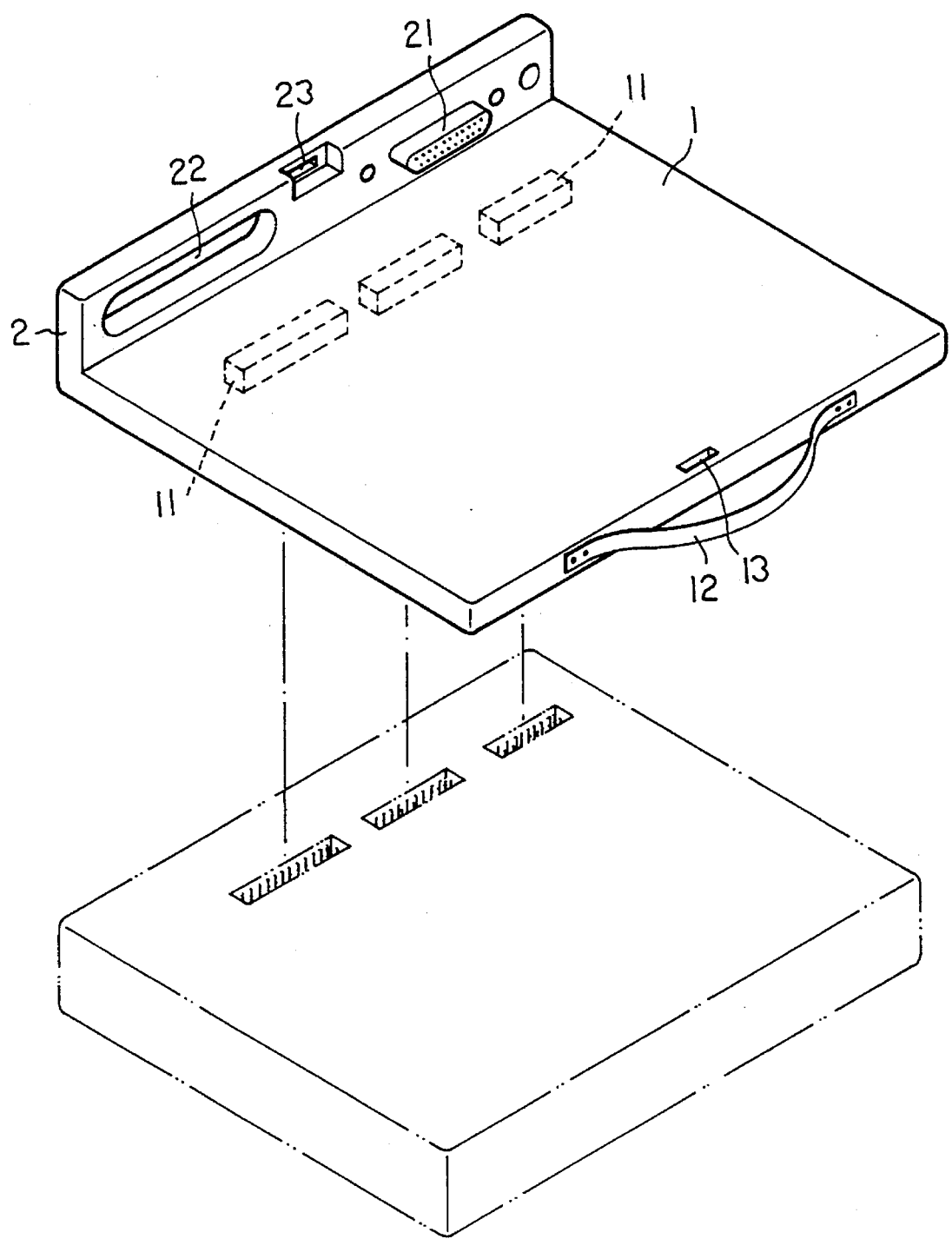
FIG. 1 is a perspective view of a portable notebook computer expansion adapter according to the preferred embodiment of the present invention.

Referring to FIG. 1, a portable notebook computer expansion adapter in accordance with the present invention is generally comprised of a flat base plate 1, and an upright stop plate 2 connected to the flat base plate 1 at one side at right angles. The flat base plate 1 is made in size corresponding to the notebook to be connected, having a plurality of expansion connectors 11 on a bottom surface thereof for connecting respective connectors on the peripheral equipment to be connected, a handle 12 on one side opposite to the upright stop plate 2, and a through hole 13 in the middle near the handle 12. The upright stop plate 2 comprises a fastening hole 23 in the middle for fastening a tie strap, a mainframe connector 21 at one side by the fastening hole 23 for connecting a respective connector on the notebook computer to be connected, and a through hole 22 at an opposite side by the fastening hole 23 for receiving the I/O connector of the notebook computer to be connected. The height of the upright stop plate 2 is made according to the height of the notebook computer to be connected. There is also provided an electric circuit (not shown) connected between the mainframe connector 21 on the upright stop plate 22 and the expansion connectors 11 on the flat base plate 1.

Figure 2:
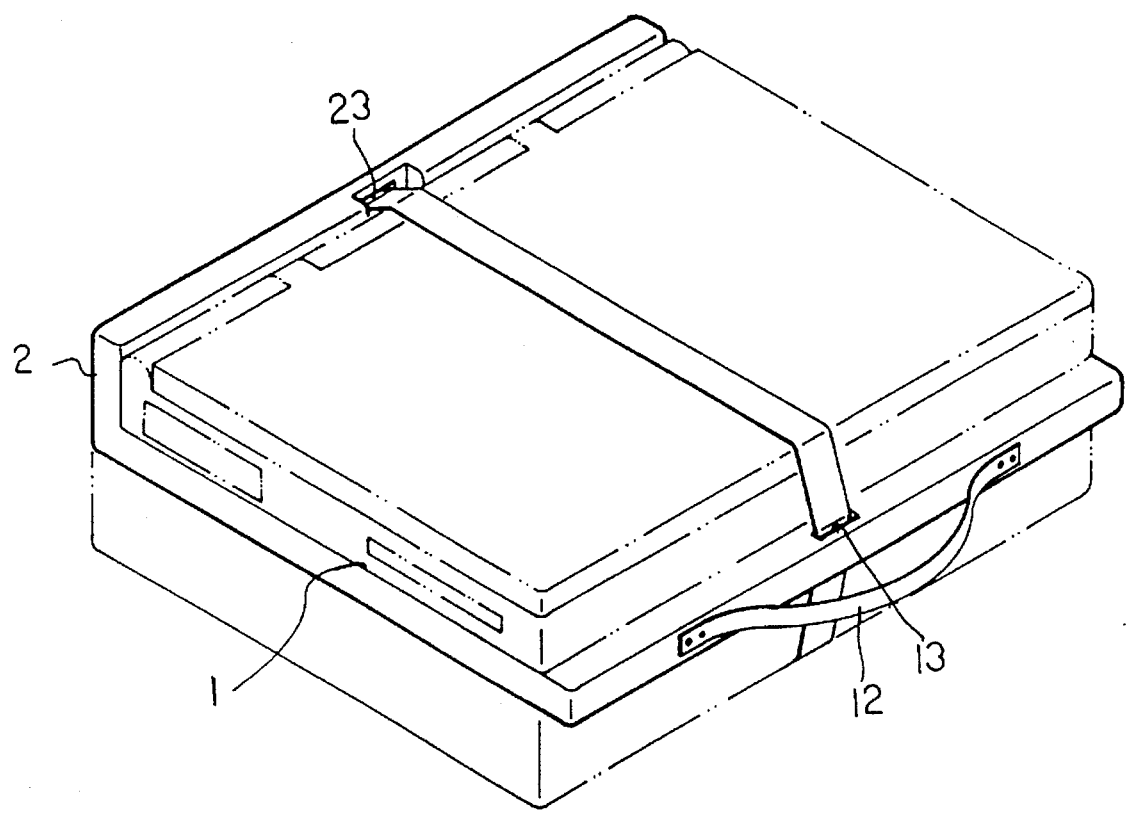
FIG. 2 shows a notebook computer and a peripheral equipment connected to the portable notebook computer expansion adapter at two opposite sides and fastened together by a tie strap.

Referring to FIG. 2, when a notebook computer is placed on the flat base plate 1, the mainframe connector 21 on the upright stop plate 2 is connected to the respective connector on the notebook computer permitting the I/O connector of the notebook computer to be received in the through hole 22 on the upright stop plate 2, and then the peripheral equipment to be used is fastened to the flat base plate 1 at the bottom and electrically connected to the expansion connectors 11. When installed, a tie strap may be inserted through the through hole 13 on the flat base plate 1 with its two opposite ends wound round the notebook computer and the peripheral equipment and then fastened to the fastening holes 23, and therefore the whole system can be carried by hand through the handle 12.

While only one embodiment of the present invention has been shown and described, it will be understood that various modifications and changes could be made without departing from the spirit and scope of the invention.

What is claimed is:

1. A portable notebook computer expansion adapter for use with a portable notebook computer comprising:

a flat base plate fitting below the notebook computer to be connected and having a plurality of expansion connectors on a bottom surface thereof for connecting a computer peripheral equipment to the notebook computer, said flat base plate further having a through hole in the middle near a front side thereof for inserting a tie strap; and a stop wall raised from said flat base plate at one side and stoppable against the notebook computer in a flush manner, said stop wall comprising a mainframe connector connectable to a respective connector on the notebook computer, an electric circuit connected to said expansion connectors of said flat base plate, a through hole which receives the I/O connector of the notebook computer, and a fastening hole in the middle for fastening the ends of said tie strap.

2. The portable notebook computer expansion adapter of claim 1 wherein said flat base plate has a handle on a front side thereof opposite to said stop wall.

* * * * *